United States Patent
Nilsson et al.

(10) Patent No.: US 12,302,435 B2
(45) Date of Patent: May 13, 2025

(54) RESUMED BEAMFORMED COMMUNICATION WITH A TERMINAL DEVICE

(71) Applicant: Telefonaktiebolaget LM Ericsson (publ), Stockholm (SE)

(72) Inventors: Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 357 days.

(21) Appl. No.: 17/785,895

(22) PCT Filed: Dec. 17, 2019

(86) PCT No.: PCT/EP2019/085565
§ 371 (c)(1),
(2) Date: Jun. 15, 2022

(87) PCT Pub. No.: WO2021/121556
PCT Pub. Date: Jun. 24, 2021

(65) Prior Publication Data
US 2023/0027215 A1    Jan. 26, 2023

(51) Int. Cl.
*H04W 76/19* (2018.01)
*H04W 16/28* (2009.01)
(Continued)

(52) U.S. Cl.
CPC .......... *H04W 76/19* (2018.02); *H04W 16/28* (2013.01); *H04W 76/20* (2018.02); *H04L 41/5016* (2013.01); *H04W 24/00* (2013.01)

(58) Field of Classification Search
CPC ..... H04W 76/00; H04W 76/10; H04W 76/19; H04W 76/20; H04W 76/27; H04W 16/00;
(Continued)

(56) References Cited

U.S. PATENT DOCUMENTS

| 11,324,064 B2 * | 5/2022 | Cirik ............. H04W 76/19 |
| 2018/0167925 A1 | 6/2018 | Liu et al. |

(Continued)

FOREIGN PATENT DOCUMENTS

| WO | WO-2019029562 A1 * | 2/2019 | ............. H04B 7/06 |
| WO | WO-2019091273 A1 * | 5/2019 | ............. H04W 24/10 |
| WO | WO-2019191872 A1 * | 10/2019 | ............. H04W 76/00 |

OTHER PUBLICATIONS

International Search Report and Written Opinion issued in International Application No. PCT/EP2019/085565, dated Aug. 10, 2020 (12 pages).

*Primary Examiner* — Warner Wong
(74) *Attorney, Agent, or Firm* — Rothwell, Figg, Ernst & Manbeck, P.C.

(57) ABSTRACT

There is provided mechanisms for beam related statistics aided resumed beamformed communication with a terminal device. A method is performed by a radio access network node. The method comprises providing network access to the terminal device by, in a first set of beams, performing beamformed communication with the terminal device until the terminal device leaves radio resource control (RRC) connected mode. The method comprises storing beam related statistics of the beamformed communication. The method comprises providing resumed network access to the terminal device by, in a second set of beams, performing resumed beamformed communication with the terminal device upon the terminal entering RRC connected mode. How to perform the resumed beamformed communication is based on the beam related statistics.

14 Claims, 5 Drawing Sheets

(51) Int. Cl.
*H04W 76/20* (2018.01)
*H04L 41/5009* (2022.01)
*H04W 24/00* (2009.01)

(58) Field of Classification Search
CPC ... H04W 16/24; H04W 16/28; H04W 72/046; H04W 72/231; H04W 72/542; H04W 24/00; H04W 24/04; H04W 24/10; H04W 47/822; H04L 67/14
See application file for complete search history.

(56) References Cited

U.S. PATENT DOCUMENTS

| | | | | |
|---|---|---|---|---|
| 2018/0227035 | A1* | 8/2018 | Cheng | H04B 7/0626 |
| 2019/0053072 | A1* | 2/2019 | Kundargi | H04W 16/28 |
| 2019/0098520 | A1* | 3/2019 | Kim | H04W 76/27 |
| 2019/0253986 | A1* | 8/2019 | Jeon | H04L 5/0048 |
| 2019/0306829 | A1 | 10/2019 | Abedini et al. | |
| 2019/0349832 | A1* | 11/2019 | Lee | H04W 76/19 |
| 2019/0350028 | A1* | 11/2019 | Kaasalainen | H04W 76/11 |
| 2020/0137657 | A1* | 4/2020 | Chavva | H04W 36/0058 |
| 2020/0204237 | A1* | 6/2020 | Zhou | H04W 24/10 |
| 2020/0266942 | A1* | 8/2020 | Akkarakaran | H04W 72/0453 |
| 2020/0359241 | A1* | 11/2020 | Siomina | H04W 24/08 |
| 2020/0373990 | A1* | 11/2020 | Da Silva | H04W 76/27 |
| 2020/0374960 | A1* | 11/2020 | Deenoo | H04B 7/0695 |
| 2020/0382184 | A1* | 12/2020 | Shimizu | H04B 7/061 |
| 2020/0413476 | A1* | 12/2020 | He | H04W 52/028 |
| 2021/0068188 | A1* | 3/2021 | Ryu | H04L 5/0023 |
| 2021/0344463 | A1* | 11/2021 | Bergqvist | H04W 24/10 |
| 2021/0392633 | A1* | 12/2021 | Rege | H04W 74/0833 |
| 2022/0015179 | A1* | 1/2022 | Zheng | H04W 24/10 |
| 2022/0103227 | A1* | 3/2022 | Lee | H04W 76/19 |
| 2022/0182893 | A1* | 6/2022 | da Silva | H04W 36/0058 |
| 2022/0217563 | A1* | 7/2022 | Teyeb | H04W 24/08 |
| 2022/0416855 | A1* | 12/2022 | Oh | H04W 16/28 |
| 2023/0284056 | A1* | 9/2023 | Fu | H04W 16/18 370/328 |

* cited by examiner

RESUMED BEAMFORMED COMMUNICATION WITH A TERMINAL DEVICE

CROSS REFERENCE TO RELATED APPLICATION(S)

This application is a 35 U.S.C. § 371 National Stage of International Patent Application No. PCT/EP2019/085565, filed Dec. 17, 2019.

TECHNICAL FIELD

Embodiments presented herein relate to a method, a radio access network node, a computer program, and a computer program product for beam related statistics aided resumed beamformed communication with a terminal device.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

To send or receive data a terminal device needs to be in radio resource control (RRC) connected mode. However, to save energy for the terminal device, a terminal device that does not have data to transmit and/or receive data should preferably leave RRC connected mode, and hence enter RRC idle mode or inactive mode, until there is data to be transmitted to, or received by, the terminal device. Once the terminal device again enters RRC connected mode, a new beam management procedure needs to be performed for the terminal device. As noted above, beam management could consume substantial portions of time as well as network resources.

Hence, there is still a need for improved beam management.

SUMMARY

An object of embodiments herein is to enable efficient beam management of a terminal device entering RRC connected mode.

According to a first aspect there is presented a method for beam related statistics aided resumed beamformed communication with a terminal device. The method is performed by a radio access network node. The method comprises providing network access to the terminal device by, in a first set of beams, performing beamformed communication with the terminal device until the terminal device leaves RRC connected mode. The method comprises storing beam related statistics of the beamformed communication. The method comprises providing resumed network access to the terminal device by, in a second set of beams, performing resumed beamformed communication with the terminal device upon the terminal entering RRC connected mode. How to perform the resumed beamformed communication is based on the beam related statistics.

According to a second aspect there is presented a radio access network node for beam related statistics aided resumed beamformed communication with a terminal device. The radio access network node comprises processing circuitry. The processing circuitry is configured to cause the radio access network node to provide network access to the terminal device by, in a first set of beams, performing beamformed communication with the terminal device until the terminal device leaves RRC connected mode. The processing circuitry is configured to cause the radio access network node to store beam related statistics of the beamformed communication. The processing circuitry is configured to cause the radio access network node to provide resumed network access to the terminal device by, in a second set of beams, performing resumed beamformed communication with the terminal device upon the terminal entering RRC connected mode. How to perform the resumed beamformed communication is based on the beam related statistics.

According to a third aspect there is presented a radio access network node for beam related statistics aided resumed beamformed communication with a terminal device. The radio access network node comprises a communication module configured to provide network access to the terminal device by, in a first set of beams, performing beamformed communication with the terminal device until the terminal device leaves RRC connected mode. The radio access network node comprises a store module configured to store beam related statistics of the beamformed communication. The radio access network node comprises a communication module configured to provide resumed network access to the terminal device by, in a second set of beams, performing resumed beamformed communication with the terminal device upon the terminal entering RRC connected mode. How to perform the resumed beamformed communication is based on the beam related statistics.

According to a fourth aspect there is presented a computer program for beam related statistics aided resumed beamformed communication with a terminal device, the computer program comprising computer program code which, when run on a radio access network node 20, causes the radio access network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient beam management of the terminal device upon the terminal device entering RRC connected mode Advantageously, the use of stored beam related statistics of the beamformed communication when performing resumed beamformed communication will reduce the overhead and latency in the system.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
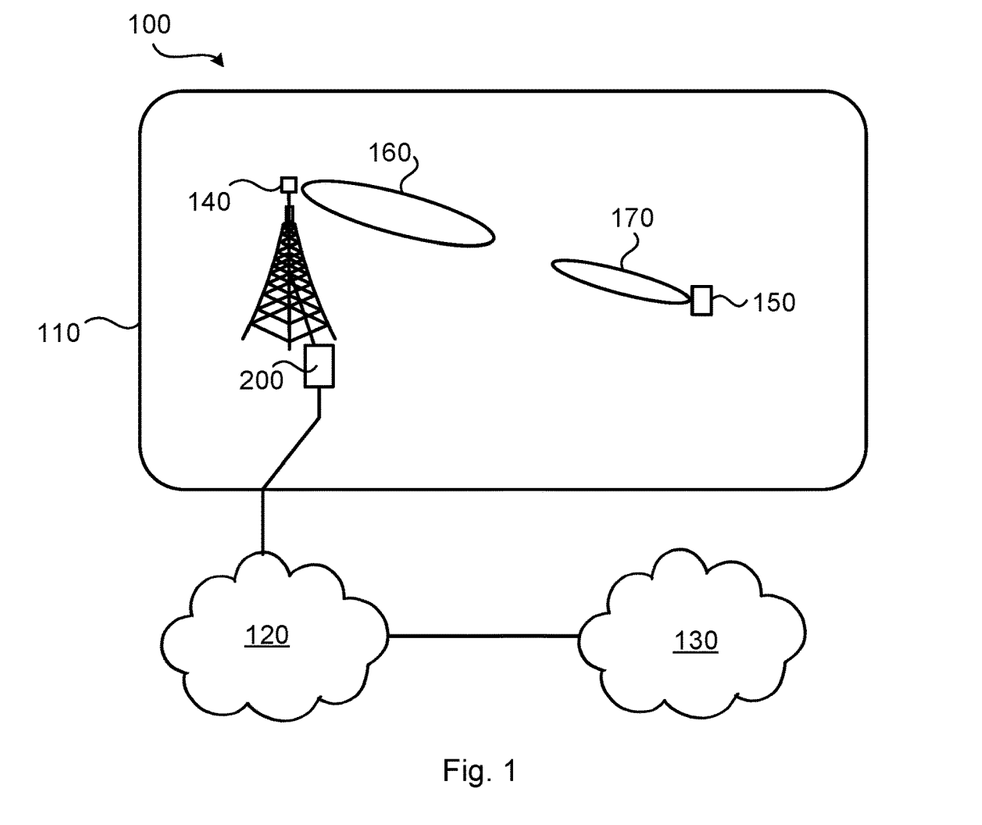
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio access network node 200 configured to provide network access to at least one terminal device 150 in a radio access network 110. The radio access network 110 is operatively connected to a core network 120. The core network 120 is in turn operatively connected to a service network 130, such as the Internet. The terminal device 150 is thereby enabled to, via the radio access network node 200, access services of, and exchange data with, the service network 130.

The radio access network node 200 comprises, is collocated with, is integrated with, or is in operational communications with, a transmission and reception point (TRP) 140. The radio access network node 200 (via its TRP 140) and the terminal device 150 are configured to communicate with each other in beams. In the illustrative example of FIG. 1, beam 160 is the beam currently being used by the TRP 140 for communication with the terminal device 150, and beam 170 is the beam currently being used by the terminal device 150 for communication with the TRP 140.

Examples of radio access network node 200 are radio base stations, base transceiver stations, Node Bs, evolved Node Bs, g NBs, access points, access nodes, and backhaul nodes. Examples of terminal devices 150 are wireless devices, mobile stations, mobile phones, handsets, wireless local loop phones, user equipment (UE), smartphones, laptop computers, tablet computers, network equipped sensors, network equipped vehicles, and so-called Internet of Things devices.

Figure 2:
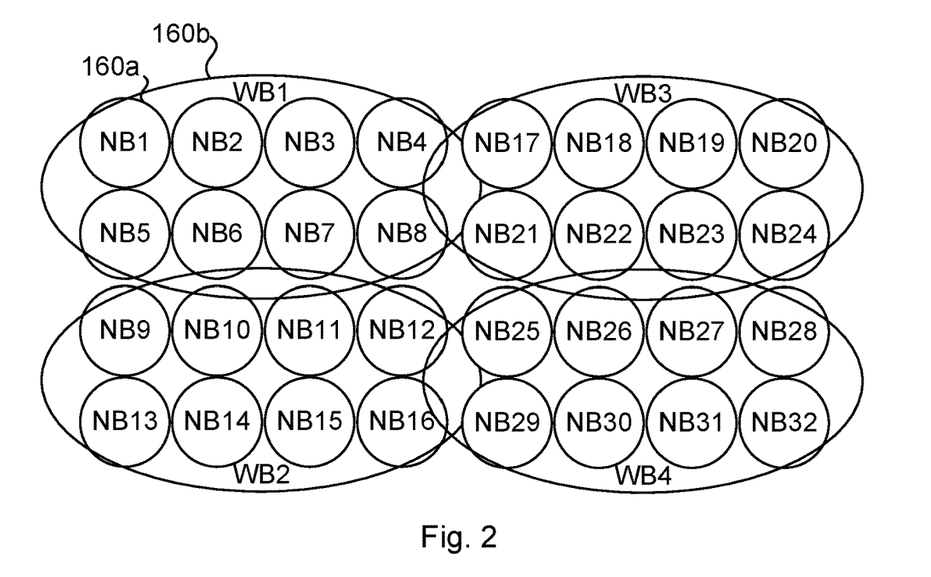
FIG. 2 schematically illustrates beams according to an embodiment.

FIG. 2 illustrates one example of one set of narrow beams (NB1:NB32, one of which is identified at reference numeral 160a) and one set of wide beams (WB1:WB4, one of which is identified at reference numeral 160b) that could be used by the radio access network node 200 for beamformed communication with the terminal device iso. The wide beams WB1:WB4 could be used in a first periodic beam management procedure (so-called P1 procedure) to find a coarse direction towards the terminal device 150 and the narrow beams NB1:NB32 could be used in a second beam management procedure (so-called P2 procedure) in order to find a narrow beam that could be used by the radio access network node 200 for data transmission and/or reception to/from the terminal device iso. One way to select which narrow beams NB1:NB32 to be included in the P2 procedure is to determine which of the wide beams WB1:WB4 that, for transmission of a reference signal, such as CSI-RS, towards the terminal device 150 results in the highest received reference signal received power (RSRP) at the terminal device 200. The narrow beams that are confined within the angular coverage area of that wide beam are then selected for the P2 procedure. For example, assuming that the P1 procedure indicates that wide beam WB1 is the best wide beam, then the beams for the P-2 procedure would be the narrow beams NB1-NB8.

Each time the terminal device 150 enters RRC connected mode, a new beam management procedure needs to be performed for the terminal device 150. As noted above, beam management could consume substantial portions of time as well as network resources.

Further in this respect, measurements indicate that traffic (i.e., data communicated to and/or from the terminal device 150) is constituted by a mix of many small packets and few large packets, where the small packets greatly outnumber the large packets. However, regardless of how small a packet is, it will require transmission of one physical downlink control channel (PDCCH) instance and transmission of one physical downlink shared channel (PDSCH) instance or physical uplink shared channel (PUSCH) instance. It will also require the terminal device 150 being in RRC connected mode and having received RRC reconfiguration. This means that both small and large packets should be efficiently transmitted using beamformed communication. Measurements also indicate that the time from when a terminal device 150 leaves RRC connected mode for either RRC idle mode or RRC inactive mode to when the same terminal device 150 returns back again to RRC connected mode is sometimes so short that at least long-term channel state information (CSI) might be reused between adjacent occurrences of the terminal device 150 being in RRC connected mode.

When the terminal device 150 leaves RRC connected mode it might thus be beneficial for the radio access network node 200 to store beam related information of the previous communication with the terminal device 150 in case the terminal device 150 returns to RRC connected mode within a certain time, e.g. for transmission and/or reception of small packets.

At least some of the herein disclosed embodiments are therefore based on the radio access network node 200 determining, based on beam related statistics, how to use stored beam related information from previous communication with the terminal device 150 upon the terminal device 150 again entering RRC connected mode The embodiments disclosed herein relate to mechanisms for beam related statistics aided resumed beamformed communication with a terminal device iso. In order to obtain such mechanisms there is provided a radio access network node 200, a method performed by the radio access network node 200, a computer program product comprising code, for example in the form of a computer program, that when run on a radio access network node 200, causes the radio access network node 200 to perform the method.

Figure 3:
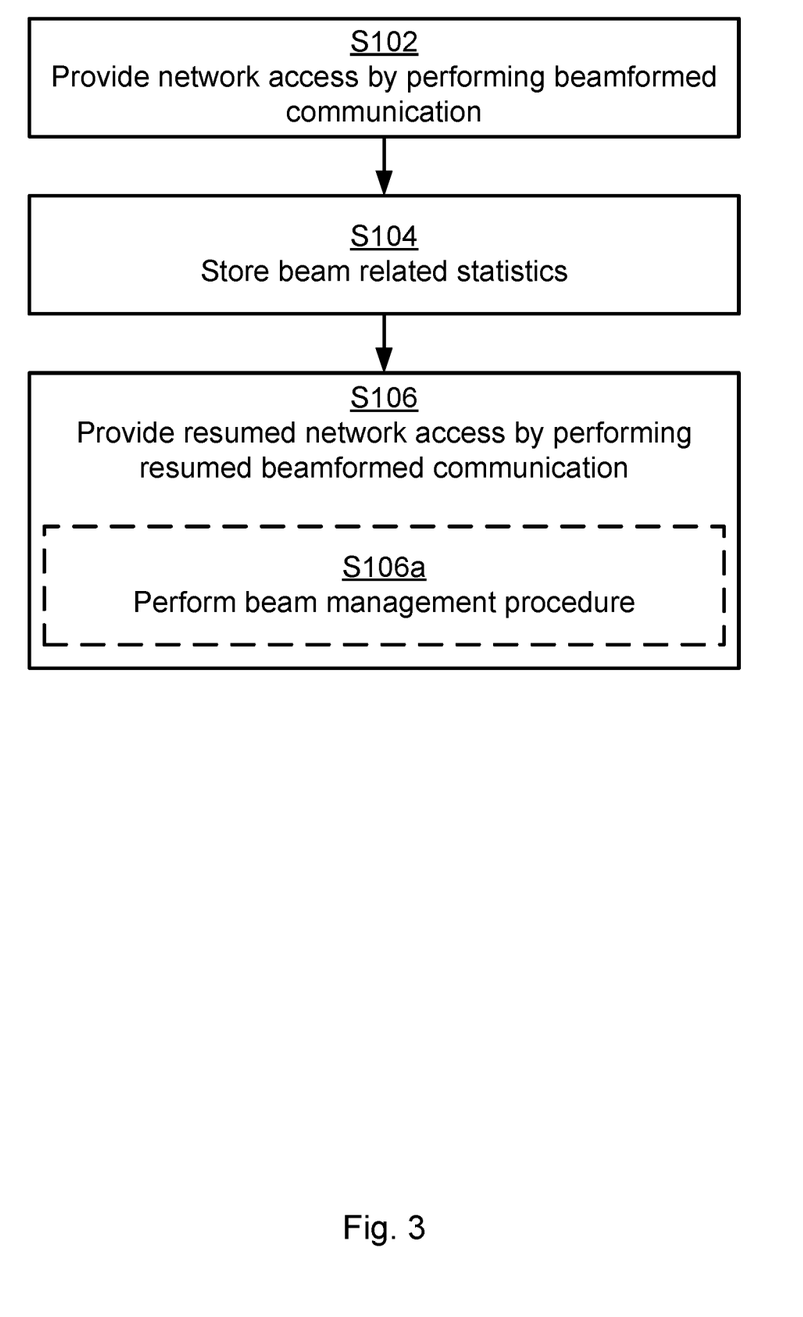
FIG. 3 is a flowchart of methods according to embodiments.

FIG. 3 is a flowchart illustrating embodiments of methods for beam related statistics aided resumed beamformed communication with a terminal device 150. The methods are performed by the radio access network node 200. The methods are advantageously provided as computer programs 820.

It assumed that the radio access network node 200 has established a communication session with the terminal device 150. Hence, the radio access network node 200 is configured to perform step S102:

S102: The radio access network node 200 provides network access to the terminal device 150 by, in a first set of beams, performing beamformed communication with the terminal device 150 until the terminal device 150 leaves RRC connected mode.

Parameters, such as beam related statistics of the beamformed communication, are stored by the radio access network node 200 for future use. Hence, the radio access network node 200 is configured to perform step S104:

S104: The radio access network node 200 stores beam related statistics of the beamformed communication with the terminal device iso.

Beamformed communication upon the terminal device 150 again entering RRC connected mode can then be based on the stored beam related statistics of that terminal device iso. Hence, the radio access network node 200 is configured to perform step S106:

S106: The radio access network node 200 provides resumed network access to the terminal device 150 by, in a second set of beams, performing resumed beamformed communication with the terminal device 150 upon the terminal entering RRC connected mode. How to perform the resumed beamformed communication is based on the beam related statistics.

In this respect, the second set of beams might comprise some of the beams (or beam weights or beam directions/shapes) of the first set of beams or even be identical to the first set of beams. Aspects of which beams to be part of the second set of beams will be disclosed below. Further, how to perform the resumed beamformed communication might be based also on other factors, properties, or parameters, in addition to the beam related statistics.

Embodiments relating to further details of beam related statistics aided resumed beamformed communication with a terminal device 150 as performed by the radio access network node 200 will now be disclosed.

In some aspects, which beams to be used for the resumed beamformed communication is based on the beam related statistics. That is, in some embodiments, which beams to include in the second set of beams is determined according to the beam related statistics.

Aspects of how to perform resumed beamformed communication will now be disclosed.

In some aspects, how to perform resumed beamformed communication depends on how often beams were changed before the terminal device 150 left RRC connected mode. That is, in some embodiments, how to perform the resumed beamformed communication depends on whether the total number of beam changes is higher or lower than a first change threshold, or the number of beam changes per time unit is higher or lower than a second change threshold. A significance value might relate to the number of beam changes per time interval (beam change rate), or to a moving average of the time between beam changes, or to the inverse of harmonic mean of time between beam changes.

In some aspects, how to perform resumed beamformed communication depends on how long the terminal device 150 was in inactive mode and/or idle mode. That is, in some embodiments, how to perform the resumed beamformed communication depends on whether the time duration between the terminal device 150 leaving and entering RRC connected mode is shorter or longer than a time threshold. The time threshold might be dependent on the aforementioned significance value.

Aspects of the beam related statistics will be disclosed next.

There could be different types of beams in the first set of beams. In some aspects the first set of beams comprises beams having different beam widths. In some examples the first set of beams over time at least comprises beams of a first beam width and beams of a second beam width, wherein the first beam width is narrower than the second beam width. In some aspects the beams of the first beam width correspond to the beams NB1:NB32 of FIG. 2 and the beams of the second beam width correspond to the beams WB1:WB4 of FIG. 2. However, this does not exclude that there also could be beams of a third beam width, and/or beams of a fourth beam width, etc. in the first set of beams. Thereby, although there are two classes of beams; one class with narrow beams and one class with wide beams, not all narrow beams need to have the same beam width and not all wide beams need to have the same beam width.

In some aspects the beam related statistics pertain to the last used narrow beam for communicating with the terminal device iso. In particular, in some embodiments, the beam related statistics pertain to which of the beams of the first beam width was most recently used before the terminal device 150 leaving the RRC connected mode.

In some aspects the beam related statistics pertain to the last used wide beam for communicating with the terminal device iso. In particular, in some embodiments, the beam related statistics pertain to which of the beams of the second beam width was most recently used before the terminal device 150 leaving the RRC connected mode.

In some aspects the beam related statistics pertain to reference signal received power (RSRP) values of beams used for communicating with the terminal device iso. In particular, in some embodiments, the beam related statistics pertain to RSRP values for those of the first set of beams that were used when performing the beamformed communication with the terminal device iso.

In some aspects the beam related statistics pertain to how often the beams used for communicating with the terminal device 150 are changed before the terminal device 150 leaves RRC connected mode. In particular, in some embodiments, the beam related statistics pertain to how often the radio access network node 200 performs beam changes between beams in the first set of beams during the beamformed communication with the terminal device iso.

As noted above, the radio access network node 200 might store statistics of how often it has changed its beam for communicating with the terminal device 150 before the terminal device 150 left RRC connected mode, and store statistics of how long time the terminal device 150 spends in RRC inactive mode and/or RRC idle mode between different data sessions. The radio access network node 200 might further store statistics of which beams (such as in the form of beam numbers) that have been used for communicating with the terminal device 150 before the terminal device 150 left RRC connected mode. The radio access network node 200 might thereby estimate the long-term spatial behaviour of the radio channel, for example by analysing whether beam switches occur between beams that have pointing directions that are spatially relatively far away from each other or relatively close to each other. Beam switches that occur between beams that have pointing directions that are spatially relatively far away from each indicate faster spatial angular variations of the radio channel (and could indicate non-line-of-sight (NLOS) propagation between the radio access network node 200 and the terminal device iso) than if the beam switches takes place between spatially adjacent beams (which could indicate line-of-sight (LOS) propagation between the radio access network node 200 and the terminal device iso). Based on any of these statistics the radio access network node 200 might determine how useful the stored beam related statistics from last time the terminal device 150 was in RRC connected mode is.

For a location-wise stationary terminal device 150 that spends short time in RRC inactive mode and/or RRC idle mode, the last used narrow beam might be included in the new beam set. That is, according to some embodiments, when the total number of beam changes between the beams of the first beam width is lower than the first change threshold, or the number of beam changes per time unit is lower than the second change threshold, and the time duration is shorter than the time threshold, the second set of beams comprises at least the beam of the first beam width (i.e., the narrow beam) that was most recently used before the terminal device 150 leaving the RRC connected mode.

For a location-wise semi-stationary terminal device 150 that spends short time in RRC inactive mode and/or RRC idle mode, the last used wide beam might be included in the new beam set. That is, according to some embodiments, when the total number of beam changes between the beams of the first beam width is higher than the change threshold, or the number of beam changes per time unit is higher than the second change threshold, but the number of beam changes between the beams of the second beam width is lower than the change threshold and the time duration is shorter than the time threshold, the second set of beams comprises at least the beam of the second beam width that was most recently used before the terminal device 150 leaving the RRC connected mode.

Thus, if the terminal device 150 is very location-wise stationary, and the time between the new data session and last data session is smaller than a threshold, the last saved narrow beam could be useful to apply by the radio access network node 200 directly at the start of the new data session with the terminal device 150, i.e., when providing resumed network access to the terminal device iso. However, in case the radio access network node 150 changes narrow beam for communicating with the terminal device 150 during the last data session rather often, but does not change wide beam so often, the last saved wide beam could, instead of the last saved narrow beam, be useful to apply by the radio access network node 200 directly at the start of the new data session with the terminal device 150, i.e., when providing resumed network access to the terminal device iso.

Further aspects of how to perform resumed beamformed communication will now be disclosed.

In some aspects, the radio access network node 200 uses the stored beam related statistics as input when determining which candidate beams to be used for a beam sweep, such as used during a so-called P1 procedure or a P2 procedure, for the terminal device 150 upon providing resumed network access to the terminal device iso. In particular, in some embodiments the radio access network node 200 is configured to perform (optional) step S106a as part of providing resumed network access to the terminal device 150 in step S106:

S106a: The radio access network node 200 performs, when the time duration is longer than the time threshold, a beam management procedure for the terminal device 150 as an initial part of providing resumed network access to the terminal device iso. Which beams to use during the beam management procedure is dependent on the beam related statistics.

In some embodiments, the beam management procedure involves a beam sweep to be performed in those beams of the second set of beams that are confined by the beam of the second beam width that was most recently used before the terminal device 150 left the RRC connected mode. This beam sweep might by the radio access network node 200 be performed during a so-called P2 procedure.

For example, assuming that the beam related statistics pertain to the last used wide beam for communicating with the terminal device 150, then the radio access network node 200 might, when providing resumed network access to the terminal device 150, perform a P2 procedure involving a beam sweep with narrow beams that are confined by that last used wide beam.

Figure 4:
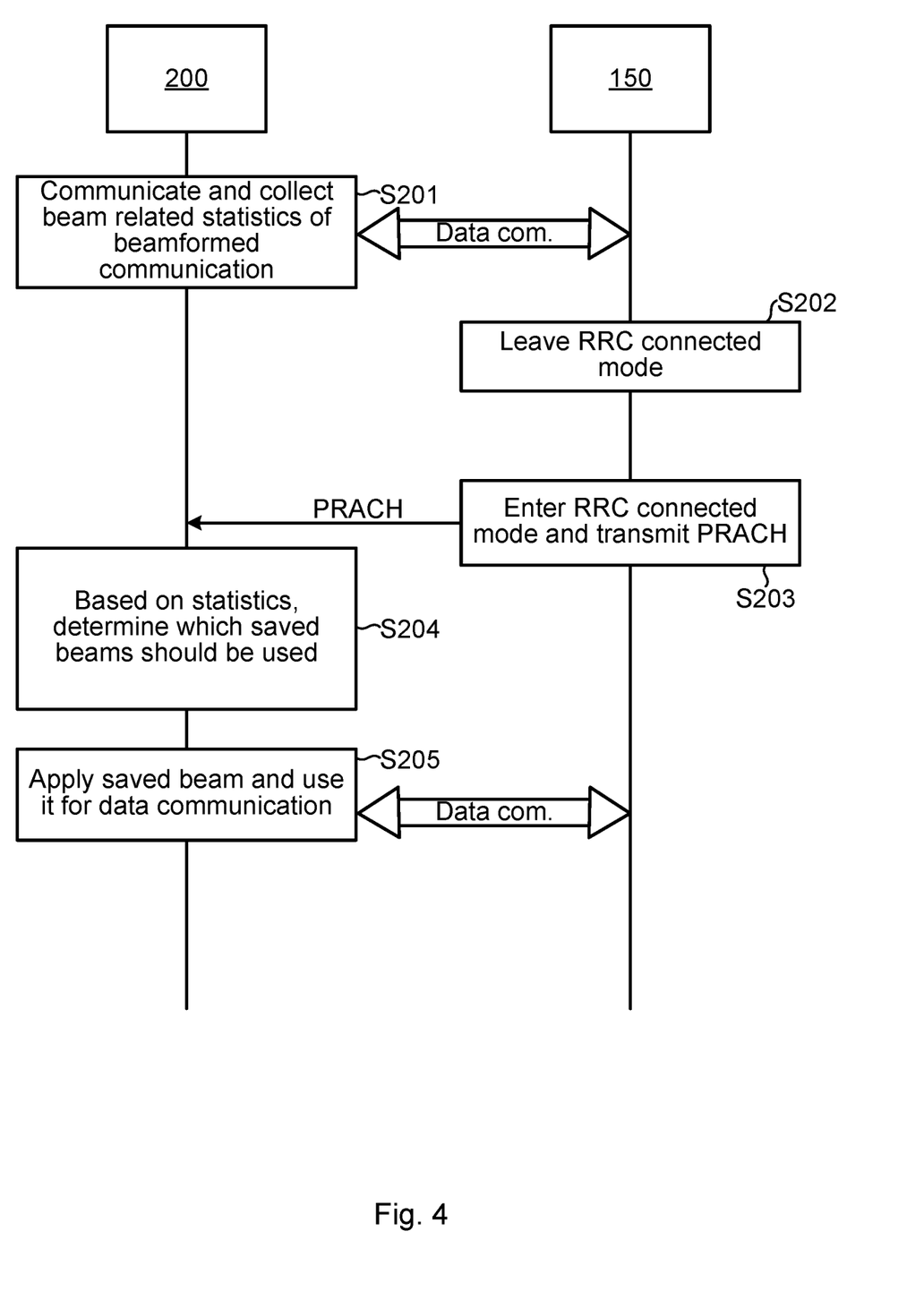
FIGS. 4 and 5 are signalling diagrams according to embodiments.

Reference is now made to the signalling diagram of FIG. 4 illustrating a first particular embodiment for beam related statistics aided resumed beamformed communication with a terminal device 150 based on at least some of the above disclosed embodiments.

S201: The radio access network node 200 provides network access to the terminal device 150 by, in a first set of beams, performing beamformed communication with the terminal device iso. Beam related statistics of the beamformed communication is collected and stored. Examples of beam related statistics have been provided above.

S202: The terminal device 150 leaves RRC connected mode.

S203: The terminal device 150 enters RRC connected mode and transmits a physical random access channel (PRACH) preamble that is received by the radio access network node 200.

S204: The radio access network node 200 determines, based on the stored beam related statistics, which of the stored beams (wide or narrow) should be used for resumed beamformed communication with the terminal device iso. For example, the radio access network node 200 might use statistics of how often it has changed its beam for communicating with the terminal device 150 before the terminal device 150 left RRC connected mode, and/or how long time the terminal device 150 spends in RRC inactive mode and/or RRC idle mode between different data sessions. For a location-wise stationary terminal device 150 that spends short time in RRC inactive mode and/or RRC idle mode, the last used narrow beam might be included in the new beam set. For a location-wise semi-stationary terminal device 150 that spends short time in RRC inactive mode and/or RRC idle mode, the last used wide beam might be included in the new beam set.

S205: The radio access network node 200 applies, depending on the stored beam related statistics, one of the stored beams (wide or narrow) when providing resumed network access to the terminal device 150.

Figure 5:
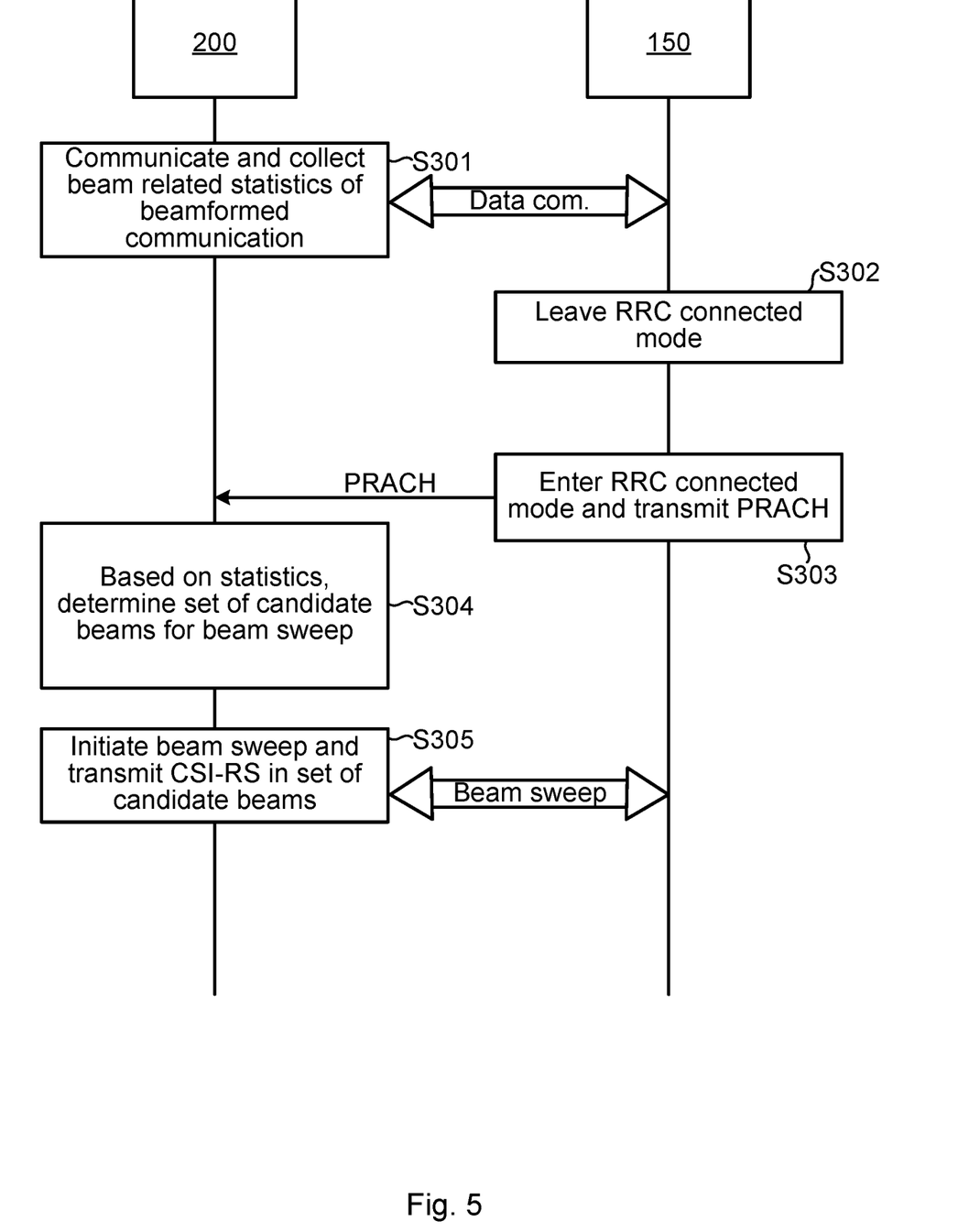

Reference is now made to the signalling diagram of FIG. 5 illustrating a second particular embodiment for beam related statistics aided resumed beamformed communication with a terminal device 150 based on at least some of the above disclosed embodiments.

S301: The radio access network node 200 provides network access to the terminal device 150 by, in a first set of beams, performing beamformed communication with the terminal device iso. Beam related statistics of the beamformed communication is collected and stored. Examples of beam related statistics have been provided above S302: The terminal device 150 leaves RRC connected mode.

S303: The terminal device 150 enters RRC connected mode and transmits a physical random access channel (PRACH) preamble that is received by the radio access network node 200.

S304: The radio access network node 200 determines, based on the stored beam related statistics, which candidate beams to be used for a beam sweep, such as used during a so-called P1 procedure or a P2 procedure, for the terminal device iso. The candidate beams might be those that that are confined by the wide beam that was most recently used for beamformed communication with the terminal device 150 before the terminal device 150 left the RRC connected mode. The candidate beams might be the N>1 best wide beams used for beamformed communication with the terminal device 150 before the terminal device 150 left the RRC connected mode.

S305: The radio access network node 200 performs a beam management procedure for the terminal device 150 as an initial part of providing resumed network access to the terminal device 150 by initiating a beam sweep. During the beam sweep, reference signals, such as CSI-RS, are transmitted in the candidate beams.

Figure 6:
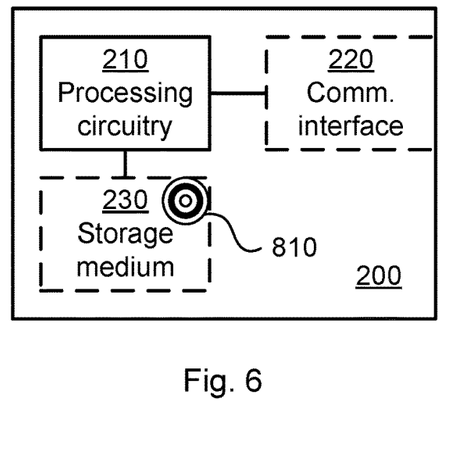
FIG. 6 is a schematic diagram showing functional units of a radio access network node according to an embodiment.

FIG. 6 schematically illustrates, in terms of a number of functional units, the components of a radio access network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio access network node 200 to perform a set of operations, or steps, as disclosed above. For example, the storage medium 230 may store the set of operations, and the processing circuitry 210 may be configured to retrieve the set of operations from the storage medium 230 to cause the radio access network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio access network node 200 may further comprise a communications interface 220 at least configured for communications with other entities, functions, nodes, and devices of the communications network 100 as well as with the terminal device iso. As such the communications interface 220 may comprise one or more transmitters and receivers, comprising analogue and digital components. The processing circuitry 210 controls the general operation of the radio access network node 200 e.g. by sending data and control signals to the communications interface 220 and the storage medium 230, by receiving data and reports from the communications interface 220, and by retrieving data and instructions from the storage medium 230. Other components, as well as the related functionality, of the radio access network node 200 are omitted in order not to obscure the concepts presented herein.

Figure 7:
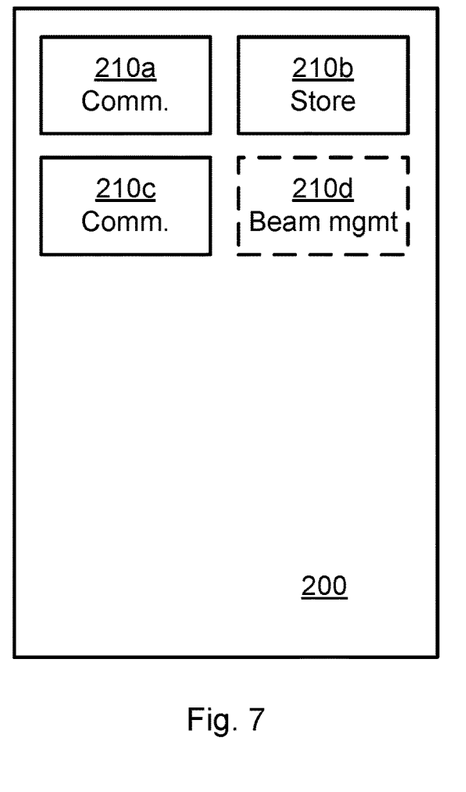
FIG. 7 is a schematic diagram showing functional modules of a radio access network node according to an embodiment.

FIG. 7 schematically illustrates, in terms of a number of functional modules, the components of a radio access network node 200 according to an embodiment. The radio access network node 200 of FIG. 7 comprises a number of functional modules; a communication module 210a configured to perform step S102, a store module 210b configured to perform step S104, and a communication module 210C configured to perform step S106. The radio access network node 200 of FIG. 7 may further comprise a number of optional functional modules, such as a beam management (mgmt) module 210d configured to perform step S106a. In general terms, each functional module 210a-210d may in one embodiment be implemented only in hardware and in another embodiment with the help of software, i.e., the latter embodiment having computer program instructions stored on the storage medium 230 which when run on the processing circuitry makes the radio access network node 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The radio access network node 200 may be provided as a standalone device or as a part of at least one further device. For example, the radio access network node 200 may be provided in a node of the radio access network or in a node of the core network. Alternatively, functionality of the radio access network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the radio access network node 200 may be executed in a first device, and a second portion of the of the instructions performed by the radio access network node 200 may be executed in a second device; the herein disclosed embodiments are not limited to any particular number of devices on which the instructions performed by the radio access network node 200 may be executed. Hence, the methods according to the herein disclosed embodiments are suitable to be performed by a radio access network node 200 residing in a cloud computational environment. Therefore, although a single processing circuitry 210 is illustrated in FIG. 6 the processing circuitry 210 may be distributed among a plurality of devices, or nodes. The same applies to the functional modules 210a-210d of FIG. 7 and the computer program 820 of FIG. 8.

Figure 8:
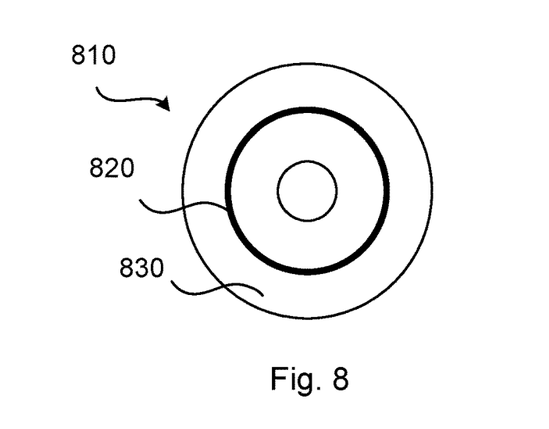
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam related statistics aided resumed beamformed communication with a terminal device, the method being performed by a radio access network node, the method comprising:
providing network access to the terminal device by, in a first set of beams, performing beamformed communication with the terminal device until the terminal device leaves radio resource control (RRC) connected mode, wherein
the first set of beams comprise a first beam of a first beam width and a second beam of a second beam width, and
the first beam width is narrower than the second beam width;
storing beam related statistics of the beamformed communication; and
providing resumed network access to the terminal device by, in a second set of beams, performing, based on the beam related statistics, resumed beamformed communication with the terminal device upon the terminal entering RRC connected mode.

2. The method of claim 1, wherein which beams to include in the second set of beams is determined according to the beam related statistics.

3. The method of claim 1, wherein the beam related statistics pertain to how often the radio access network node performs beam changes between beams in the first set of beams during the beamformed communication with the terminal device.

4. The method of claim 3, wherein how to perform the resumed beamformed communication depends on whether a total number of beam changes is higher or lower than a first change threshold, or a number of beam changes per time unit is higher or lower than a second change threshold.

5. The method of claim 1, wherein how to perform the resumed beamformed communication depends on whether a time duration between the terminal device leaving and entering the RRC connected mode is shorter or longer than a time threshold.

6. The method of claim 1, wherein the first set of beams comprise a first plurality of beams of the first beam width, and the beam related statistics pertain to which of the first plurality of beams of the first beam width was most recently used before the terminal device left the RRC connected mode.

7. The method of claim 6, wherein
the second set of beams comprises at least the beam of the first plurality of beams that was most recently used before the terminal device left the RRC connected mode as a result of a total number of beam changes between the first plurality of beams of the first beam width being lower than a first change threshold, or a number of beam changes per time unit is lower than a second change threshold, and a time duration is shorter than a time threshold.

8. The method of claim 1, wherein the first set of beams comprise a second plurality of beams of the second beam width, and the beam related statistics pertain to which of the second plurality of beams of the second beam width was most recently used before the terminal device left the RRC connected mode.

9. The method of claim 8, wherein
the first set of beams comprise a first plurality of beams of the first beam width, and
the second set of beams comprise at least the beam of the second plurality of beams that was most recently used before the terminal device left the RRC connected mode as a result of a total number of beam changes between the first plurality of beams of the first beam width being higher than a change threshold, or a number of beam changes per time unit is higher than a second change threshold, but a number of beam changes between the second plurality of beams of the second beam width is lower than the change threshold and a time duration is shorter than a time threshold.

10. The method of claim 5, wherein providing resumed network access to the terminal device further comprises:
performing, as a result of the time duration is longer than the time threshold, a beam management procedure for the terminal device as an initial part of providing resumed network access to the terminal device, wherein which beams to use during the beam management procedure is dependent on the beam related statistics.

11. The method of claim 10, wherein
the first set of beams comprise a second plurality of beams of the second beam width, and
the beam management procedure involves a beam sweep to be performed in those beams of the second set of beams that are confined by a beam of the second plurality of beams that was most recently used before the terminal device left the RRC connected mode.

12. The method of claim 1, wherein the beam related statistics pertain to reference signal received power, RSRP, values for those of the first set of beams that were used to perform the beamformed communication with the terminal device.

13. A radio access network node for beam related statistics aided resumed beamformed communication with a terminal device, the radio access network node comprising processing circuitry, the processing circuitry being configured to cause the radio access network node to:
provide network access to the terminal device by, in a first set of beams, performing beamformed communication with the terminal device until the terminal device leaves radio resource control (RRC) connected mode, wherein
the first set of beams comprise a first beam of a first beam width and a second beam of a second beam width, and
the first beam width is narrower than the second beam width;
store beam related statistics of the beamformed communication; and
provide resumed network access to the terminal device by, in a second set of beams, performing, based on the beam related statistics, resumed beamformed communication with the terminal device upon the terminal entering RRC connected mode.

14. A computer program for beam related statistics aided resumed beamformed communication with a terminal device, the computer program comprising computer code which, when run on processing circuitry of a radio access network node, causes the radio access network node to:
provide network access to the terminal device by, in a first set of beams, performing beamformed communication with the terminal device until the terminal device leaves radio resource control (RRC) connected mode, wherein
the first set of beams comprise a first beam of a first beam width and a second beam of a second beam width, and
the first beam width is narrower than the second beam width;
store beam related statistics of the beamformed communication; and
provide resumed network access to the terminal device by, in a second set of beams, performing, based on the beam related statistics, resumed beamformed communication with the terminal device upon the terminal entering RRC connected mode.

* * * * *

UNITED STATES PATENT AND TRADEMARK OFFICE
CERTIFICATE OF CORRECTION

| | | |
|---|---|---|
| PATENT NO. | : 12,302,435 B2 | Page 1 of 1 |
| APPLICATION NO. | : 17/785895 | |
| DATED | : May 13, 2025 | |
| INVENTOR(S) | : Nilsson et al. | |

It is certified that error appears in the above-identified patent and that said Letters Patent is hereby corrected as shown below:

In the Specification

In Column 4, Line 23, delete "fifth (5G)" and insert -- fifth generation (5G) --, therefor.

Signed and Sealed this
Tenth Day of February, 2026

John A. Squires
*Director of the United States Patent and Trademark Office*